UNITED STATES PATENT OFFICE.

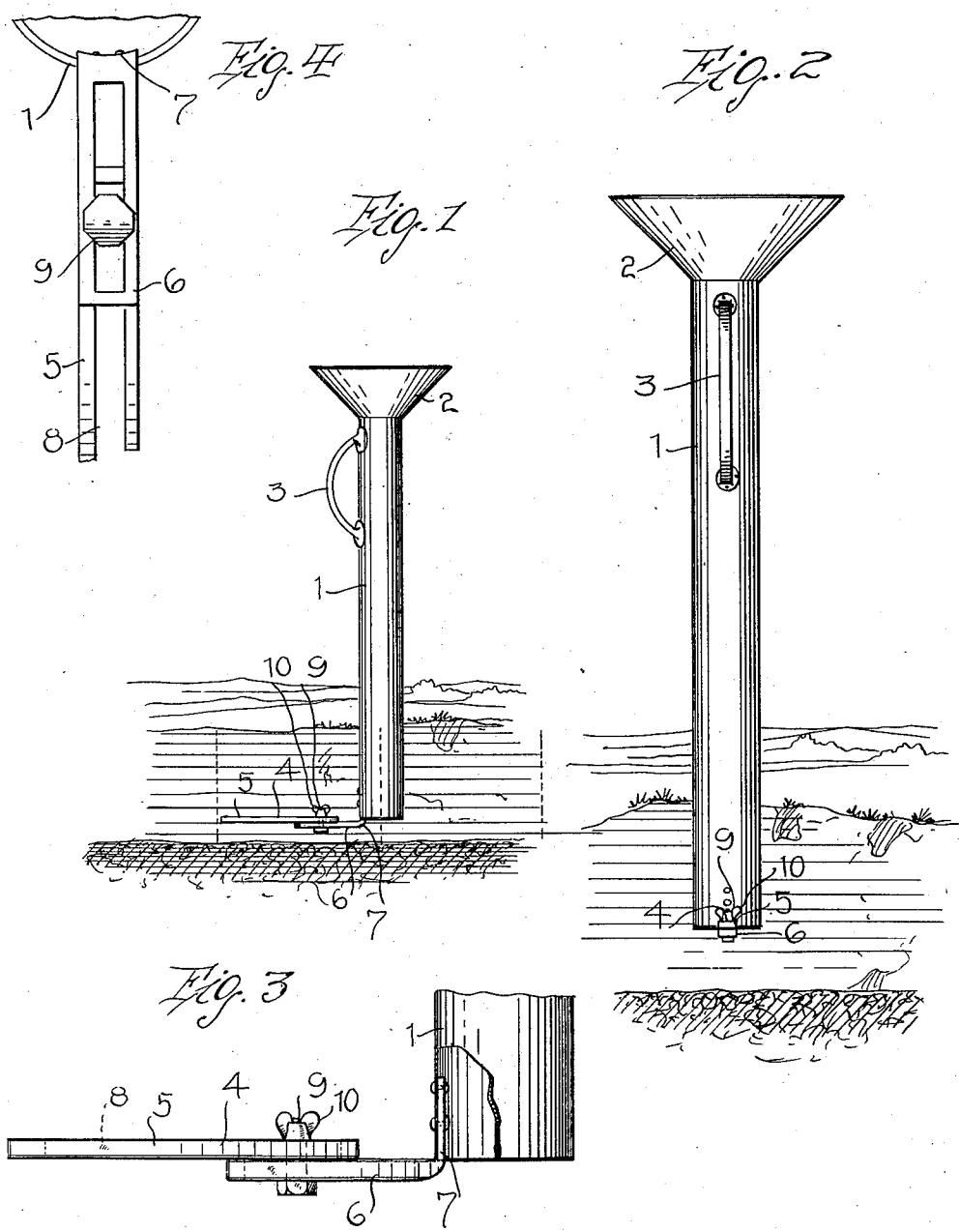

CLARENCE J. PRISET, OF WELLSBORO, PENNSYLVANIA.

POTATO-DROPPER.

1,078,165. Specification of Letters Patent. Patented Nov. 11, 1913.

Application filed February 8, 1913. Serial No. 747,119.

*To all whom it may concern:*

Be it known that I, CLARENCE J. PRISET, a citizen of the United States, residing at Wellsboro, in the county of Tioga and State of Pennsylvania, have invented certain new and useful Improvements in Potato-Droppers, of which the following is a specification, reference being had to the accompanying drawings.

This invention relates to new and useful improvements in potato droppers and more particularly to a hand dropper, the object of the invention being to provide a device of the above character which is particularly adapted for use in planting potatoes in rows or drills; the invention also aims to eliminate the necessity of bending over to place the potatoes in the rows, when planting by hand.

Another object of the invention is to provide a hand potato dropper of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a side elevation of a potato dropper constructed in accordance with my invention. Fig. 2 is a side elevation taken at right angles to Fig. 1. Fig. 3 is an enlarged side elevation of the adjustable gage, and Fig. 4 is a bottom plan view of the gage.

Referring more particularly to the drawings, 1 indicates the tubular body member which may be of any suitable size and shape and may be constructed of any suitable material. One end of the body is provided with a funnel shaped mouth or opening 2 into which the seed potatoes are dropped, the seeds passing into the body member and out the lower end thereof into the row. A handle member 3 is formed upon the periphery of the body member adjacent the mouth 2 whereby the device may be carried from place to place. It will also be understood that the dropper itself is supported in an upright position when planting by means of the handle.

In order to determine the distance between each hill as the seeds are dropped, I provide a suitable gage 4 which comprises the two sections 5 and 6, the section 6 having the inner end thereof upwardly turned as shown at 7 riveted or otherwise secured to the lower end of the body member 1, the main portion of the section 6 being disposed in a substantially horizontal plane. The section 5 is provided with an elongated slot 8 in which is disposed the adjusting screw 9, carried by the section 6, and adapted to hold the section 5 in various adjusted positions. The adjusting screw 9 is provided with a winged head 10 whereby the same may be readily manipulated. From this it will be seen that the section 5 may be adjusted according to the distance required between each potato as it is dropped in the row.

From the above description taken in connection with the accompanying drawings, it will be readily apparent that I have provided a simple and durable hand potato dropper whereby the seed potatoes may be quickly and readily dropped into the row and spaced the required distance apart. The dropper itself will eliminate the necessity of bending over to place the potatoes in the rows. In the use of my improved hand dropper, the seed potatoes may be carried in any suitable manner and readily placed into the mouth 2 of the body. It will also be apparent that the device in itself is extremely simple in construction and can be manufactured at comparatively low cost.

While I have shown and described the preferred form of my invention it will be obvious that various changes in the details of construction and in the proportions may be resorted to for successfully carrying my invention into practice without sacrificing any of the novel features or departing from the scope of the appended claim.

What I claim is:—

A device of the class described including a tubular body having a funnel shaped mouth at one end thereof, a handle carried by the body and arranged adjacent the mouth, a sectional gage member, one of said sections being provided with an upwardly turned end, which is disposed at right angles, said upwardly turned end being arranged within the lower end of the body and rigidly secured thereto, a second section slidably mounted upon the first section, said sections being provided with alined elongated slots, a bolt movable within said slots and a winged head mounted upon one end of said bolt whereby the same may be manipulated to hold the sections in various adjusted positions.

In testimony whereof I hereunto affix my signature in the presence of two witnesses.

CLARENCE J. PRISET.

Witnesses:
LEWIS H. PRISET,
FRED PRISET.

Copies of this patent may be obtained for five cents each, by addressing the "Commissioner of Patents, Washington, D. C."